(12) United States Patent
Shiba

(10) Patent No.: US 7,372,518 B2
(45) Date of Patent: May 13, 2008

(54) DISPLAY-POSITIONING MECHANISM

(75) Inventor: Kenichi Shiba, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/769,776

(22) Filed: Feb. 3, 2004

(65) Prior Publication Data

US 2004/0157665 A1 Aug. 12, 2004

(30) Foreign Application Priority Data

Feb. 4, 2003 (JP) ............................. 2003-026928

(51) Int. Cl.
 *G02F 1/1333* (2006.01)
 *H05K 7/12* (2006.01)
(52) U.S. Cl. ..................... 349/60; 349/58; 361/681
(58) Field of Classification Search ............ 349/58–60;
 455/90.3, 128, 575.1; 361/681–682, 747;
 463/46
 See application file for complete search history.

(56) References Cited

U.S. PATENT DOCUMENTS

| | | | | | |
|---|---|---|---|---|---|
| 5,775,233 | A * | 7/1998 | Kendall | ........................ | 108/59 |
| 6,148,183 | A * | 11/2000 | Higdon et al. | ........... | 455/575.1 |
| 6,226,535 | B1 * | 5/2001 | Sun | ............................. | 455/566 |
| 6,525,790 | B1 * | 2/2003 | Kan-o | ......................... | 349/58 |
| 6,665,025 | B2 * | 12/2003 | Lee | .............................. | 349/59 |
| 6,809,713 | B2 * | 10/2004 | Peng | ........................... | 345/87 |
| 7,046,264 | B2 * | 5/2006 | Moriyasu et al. | ........... | 361/681 |
| 2001/0034242 | A1 * | 10/2001 | Takagi | ........................ | 455/550 |
| 2003/0058380 | A1 * | 3/2003 | Kim et al. | ..................... | 349/58 |

FOREIGN PATENT DOCUMENTS

| | | | |
|---|---|---|---|
| JP | 1-139281 U | | 9/1989 |
| JP | 2000-004087 A | | 1/2000 |
| JP | 2001-021973 A | | 1/2001 |
| JP | 2001-285430 A | | 10/2001 |

OTHER PUBLICATIONS

Japanese Office Action dated Mar. 13, 2007.

* cited by examiner

*Primary Examiner*—Andrew Schechter
*Assistant Examiner*—W. Patty Chen
(74) *Attorney, Agent, or Firm*—Sughrue Mion, PLLC

(57) ABSTRACT

A display-positioning mechanism capable of reliably implementing, with a small number of components, relative positioning of a display aperture portion and a display. Gaps are formed between a screw head and a mounting portion and between a baseplate and an LCD unit. Hence, the LCD unit is movable within a predetermined range relative to the baseplate. When a second casing body is attached to a first casing body, from the LCD unit side, the LCD unit is accommodated at an inner side of a positioning portion, while a fitting protrusion frame of the first casing body is fitted into a fitting recess frame of the second casing body. The LCD unit is positioned in a display aperture portion by the positioning portion, and an upper face portion disposed at the inner side of the positioning portion presses against the LCD unit, which is tightly contacted with the baseplate and fixed.

14 Claims, 7 Drawing Sheets

US 7,372,518 B2

DISPLAY-POSITIONING MECHANISM

CROSS-REFERENCE TO RELATED APPLICATION

This application claims priority under 35 USC 119 from Japanese Patent Application No. 2003-26928, the disclosure of which is incorporated by reference herein.

BACKGROUND OF THE INVENTION

1. Field of the Invention

The present invention relates to a display-positioning mechanism, for positioning of a display.

2. Description of the Related Art

Heretofore, various techniques have been disclosed for implementing positioning of screen portions of displays.

For example, in a technology described in Japanese Patent Application Laid-Open (JP-A) No. 2000-4087, as shown in FIG. 6, an LCD 100 is mounted at an LCD holder 102, this LCD holder 102 is mounted at a circuit board 104, and the circuit board 104 is mounted at a front casing 106. Thus, relative positioning of a display aperture portion 106A of the front casing 106 and the LCD 100 is implemented.

Further, in a technology described in JP-A No. 2001-285430, as shown in FIG. 7, relative positioning of an LCD member 110 and a display aperture portion 116 of a casing body 114 is implemented using a window frame member 112.

However, with the technology of JP-A No. 2000-4087, there is a disadvantage in that an offset in positioning between the LCD 100 and the display aperture portion 106A will occur if there is an offset in positioning between the LCD holder 102 and the front casing 106.

Furthermore, with the technology described in JP-A No. 2001-285430, although offsets in positioning between the display aperture portion 116 and the LCD member 110 will not occur, it is necessary to use the window frame member 112, so the number of components is increased.

SUMMARY OF THE INVENTION

The present invention has been devised in consideration of the circumstances described above, and an object of the present invention is to provide a display-positioning mechanism capable of reliably implementing relative positioning of a display aperture portion and a display, with a small number of components.

In order to achieve the above-mentioned object, according to a first aspect of the present invention, a display-positioning mechanism for positioning a display inside a casing which is structured by a first casing body and a second casing body, which is attached to the first casing body, is provided, the mechanism including: a base which is fixed in the casing; a provisional fixing member which attaches the display to the base such that the display is movable within a predetermined range relative to the base; and a positioning portion for restricting movement of the display at a time of attachment of the second casing body to the first casing body, and retaining the display at a predetermined position.

DETAILED DESCRIPTION OF THE INVENTION

Below, a first embodiment of a display-positioning mechanism relating to the present invention will be described with reference to the drawings.

Figure 1:
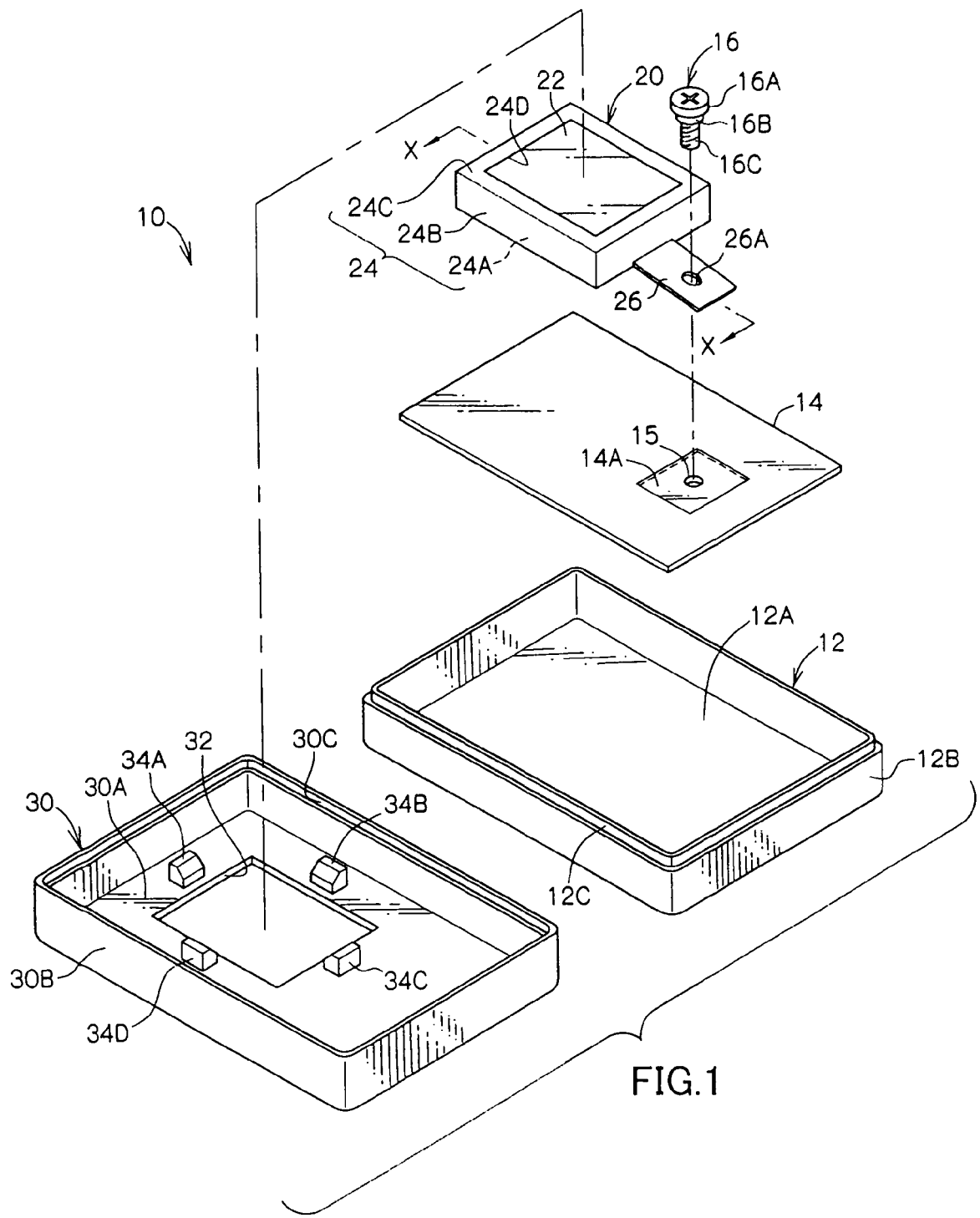
FIG. 1 is an exploded perspective view of a display-positioning mechanism relating to a first embodiment of the present invention.
Figure 2:
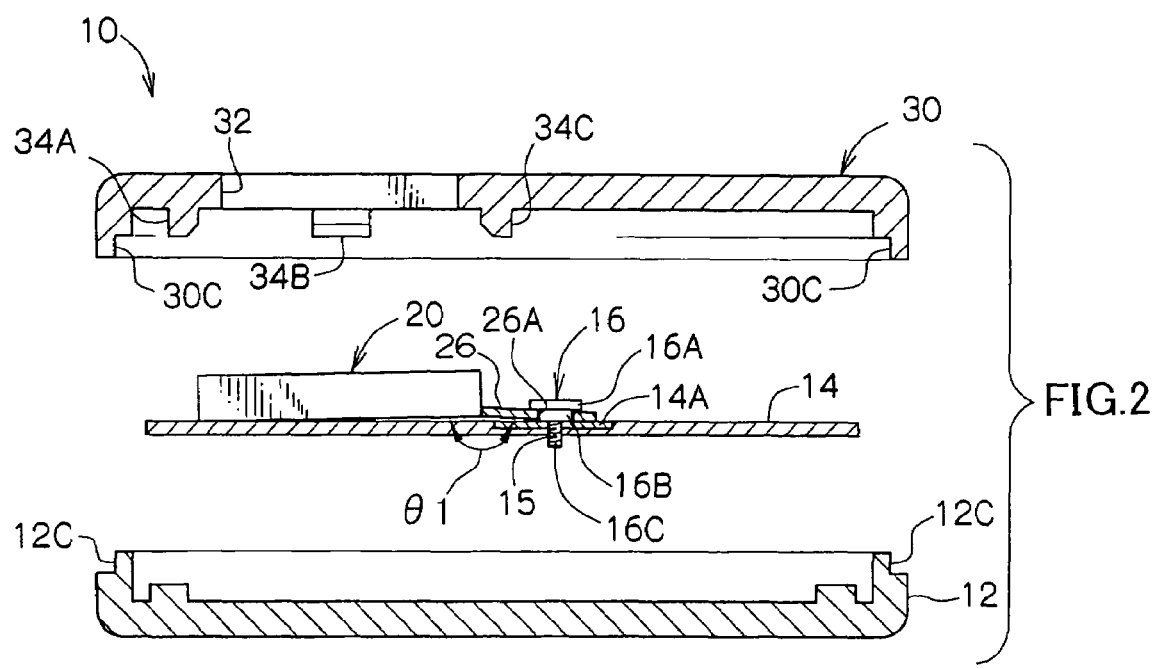
FIG. 2 is a sectional view, along line X-X of FIG. 1, of the display-positioning mechanism of the present embodiment, which is disassembled.

As shown in FIGS. 1 and 2, a display-positioning mechanism 10 is equipped with a first casing body 12, a baseplate 14, a stepped screw 16, an LCD unit 20, and a second casing body 30.

The first casing body 12 has a rectangular bowl form, and includes a bottom face portion 12A and a side face portion 12B. A fitting protrusion frame 12C is provided along an edge of the side face portion 12B. A fitting recess frame 30C of the second casing body 30, which is described later, fits onto the fitting protrusion frame 12C.

An electrical component including various operational circuits (which is not shown) is mounted at the baseplate 14. The baseplate 14 is fixed to the first casing body 12 by unillustrated members. A reference potential terminal 14A, which is capable of maintaining a reference potential, is provided at an upper face of the baseplate 14. A screw hole 15, into which the stepped screw 16 can be screwed, is formed at an inner side of the reference potential terminal 14A.

The LCD unit 20 includes an LCD 22, a frame portion 24 and a plate-like mounting portion 26. The LCD 22 displays images based on image data. The LCD 22 is fixed inside the frame portion 24. The mounting portion 26 is integrally formed as a single component with the frame portion 24, and features resiliency.

The frame portion 24 is formed with a conductive material, structures a box-like casing body for the LCD unit 20, and includes a bottom face portion 24A, a side face portion 24B and a top face frame 24C.

A presentation frame 24D, for exposing a display region of the LCD 22, is provided at the top face frame 24C.

The stepped screw 16 includes a screw head 16A, a step portion 16B and a screw portion 16C. Grooves for a flat head screwdriver (phillips screwdriver) are formed in an upper face of the screw head 16A, and a screw thread is formed at the screw portion 16C. The step portion 16B, which is disposed between the screw head 16A and the screw portion 16C, is longer than a thickness of the mounting portion 26.

A mounting hole 26A, into which only the screw portion 16C and step portion 16B of the stepped screw 16 can be inserted, is formed in the mounting portion 26.

Figure 3:
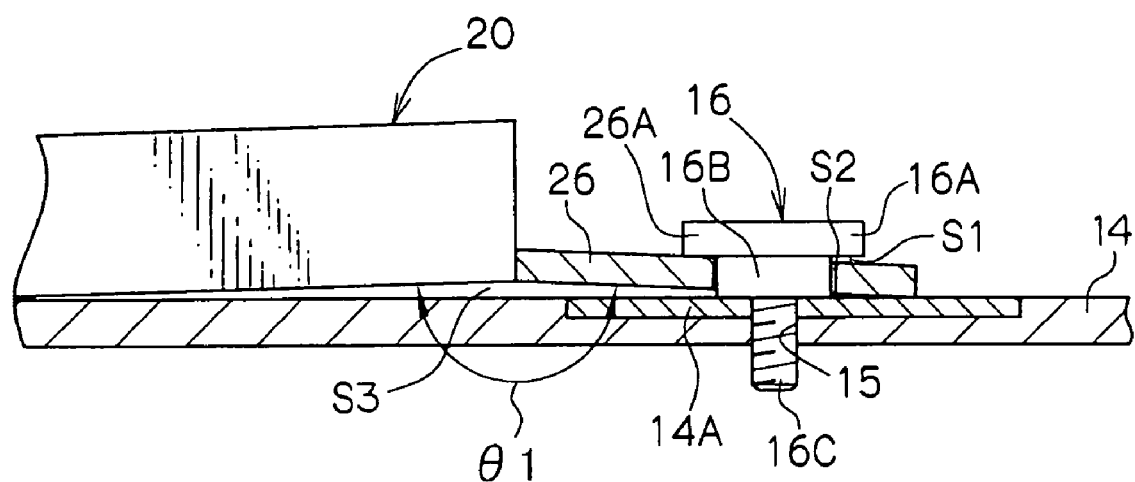
FIG. 3 is an enlarged sectional view, of a portion at which a stepped screw is attached, of the display-positioning mechanism of the present embodiment.

The screw portion 16C and step portion 16B of the stepped screw 16 are inserted into the mounting hole 26A, and the screw portion 16C is screwed into the screw hole 15. The step portion 16B has a greater diameter than the screw portion 16C, and the step portion 16B cannot be inserted into the screw hole 15. As shown in FIG. 3, when the stepped screw 16 is attached to the baseplate 14, a gap S1 (in a vertical direction) is formed between the screw head 16A and the mounting portion 26 of the LCD unit 20, a gap S2 (in the screw diameter direction) is formed between the step portion 16B of the stepped screw 16 and the mounting hole 26A (the mounting portion 26) of the LCD unit 20, and a gap S3 (in the vertical direction) is formed between the baseplate 14 and the LCD unit 20. Note that, in this embodiment, vertical and horizontal directions are mentioned for the sake of convenience, but the invention is in no way limited by this.

At a time of attachment of the LCD unit 20 by the stepped screw 16, an angle θ between the mounting portion 26 and the frame portion 24 (see, e.g., FIGS. 1 and 3) is set to an angle slightly smaller than 180° (θ1). When an external force acts and the angle (θ) is made greater than θ1, a force in a direction for returning the angle θ to θ1 is generated by the resiliency of the mounting portion 26.

As shown in FIGS. 1 and 2, the second casing body 30 has a rectangular bowl form and includes an upper face portion 30A and a side face portion 30B. The fitting recess frame 30C, which is fittable with the fitting protrusion frame 12C of the first casing body 12, is formed along an edge of the side face portion 30B.

A rectangular display aperture portion 32 is formed in the upper face portion 30A, and the LCD 22 of the LCD unit 20 is exposed through the display aperture portion 32.

Four projections 34A, 34B, 34C and 34D are formed integrally with the second casing body 30. The projections 34A, 34B, 34C and 34D protrude from the upper face portion 30A at positions which are separated by predetermined distances from respective edges of the display aperture portion 32. These projections, being formed integrally with the second casing body 30, structure a positioning portion 34 for receiving and fixing the LCD unit 20.

Each of the projections 34A, 34B, 34C and 34D is given a tapered form such that receiving the LCD unit 20 is made easier.

Below, operation of the present embodiment will be described.

First, the baseplate 14 is fixed to the first casing body 12.

Then, the screw hole 15 of the baseplate 14 and the mounting hole 26A of the LCD unit 20 are matched up, and the screw portion 16C of the stepped screw 16 is screwed into the screw hole 15. Thus, the LCD unit 20 is attached to the baseplate 14. Note that construction such that the LCD unit 20 is attached to the baseplate 14 before the baseplate 14 is fixed to the first casing body 12 is also possible.

The mounting portion 26 is electrically connected with the reference potential terminal 14A on the baseplate 14.

The LCD unit 20 is movable within a predetermined range relative to the baseplate 14, because of the gaps S1, S2 and S3 as mentioned above.

Figure 4:
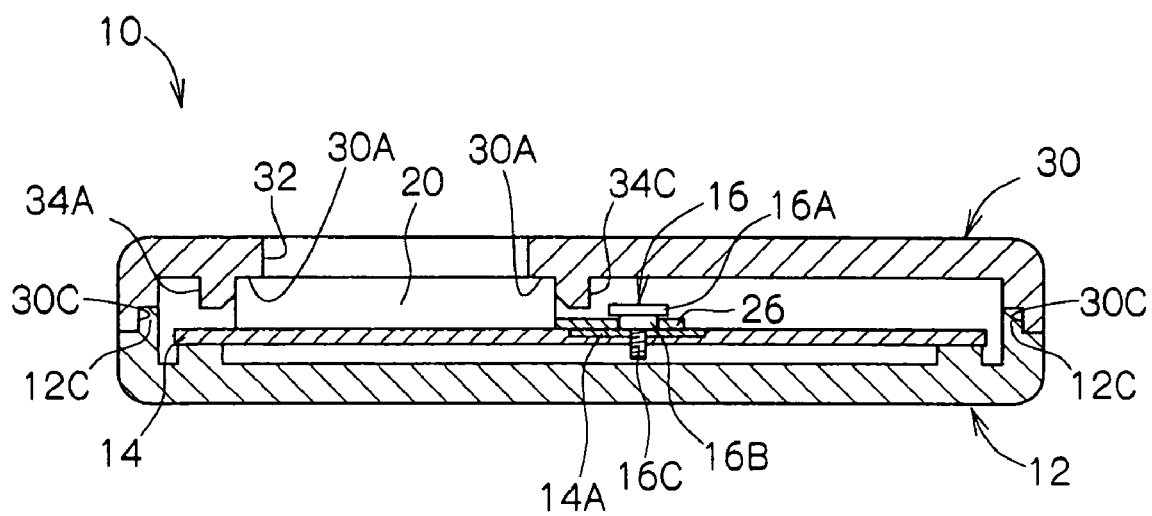
FIG. 4 is a sectional view, along line X-X of FIG. 1, of the display-positioning mechanism of the present embodiment, which has been assembled.

Next, the second casing body 30 is attached to the first casing body 12, from the LCD unit 20 side thereof. At this time, the LCD unit 20 is accommodated at an inner side of the positioning portion 34 (a receiving region thereof), and the fitting protrusion frame 12C of the first casing body 12 is fitted into the fitting recess frame 30C of the second casing body 30. Hence, the second casing body 30 is attached to the first casing body 12 (see FIG. 4). In this attached state, movement of the LCD unit 20 in an LCD unit longitudinal direction (a horizontal direction) is restricted by the positioning portion 34. That is, positioning in this direction is achieved. At the same time, movement of the LCD unit 20, which is pushed downward by a portion of the upper face portion 30A that is disposed at the inner side of the positioning portion 34, in an LCD unit thickness direction (the vertical direction) is restricted by the resiliency of the mounting portion 26. That is, positioning in this direction is achieved.

At this time, the angle θ between the mounting portion 26 and the bottom face portion 24A of the frame portion 24 is greater than θ1.

During the attachment described above, the LCD unit 20 is in a provisionally fixed state which is movable within a limited range. That is, the LCD unit 20 is movable within the predetermined range due to the gaps S1 to S3, as mentioned above.

Accordingly, even if a positional relationship of the baseplate 14 and the second casing body 30 is provisionally offset to a certain extent, the LCD unit 20 can be moved so as to compensate for such an offset.

Therefore, it is possible to position the LCD unit 20 with high accuracy relative to the display aperture portion 32 of the second casing body 30, and with great ease.

Because the positioning portion 34 is formed integrally with the second casing body 30, the number of components can be kept small. However, the positioning portion 34 may be formed separately from the second casing body 30 and structured for fixing to the second casing body 30 after formation.

Because of the resiliency of the mounting portion 26, the LCD unit 20 does not exhibit looseness.

When the LCD unit 20 is fixed to the baseplate 14, the mounting portion 26 can be closely contacted with the reference potential terminal 14A of the baseplate 14. Hence, it is possible to reliably maintain the reference potential at the LCD unit 20. Namely, the mounting portion 26 comprises functionality as a reference potential-receiving terminal which is capable of electrically contacting with the reference potential terminal 14A for maintaining the reference potential of the display.

Figure 5:
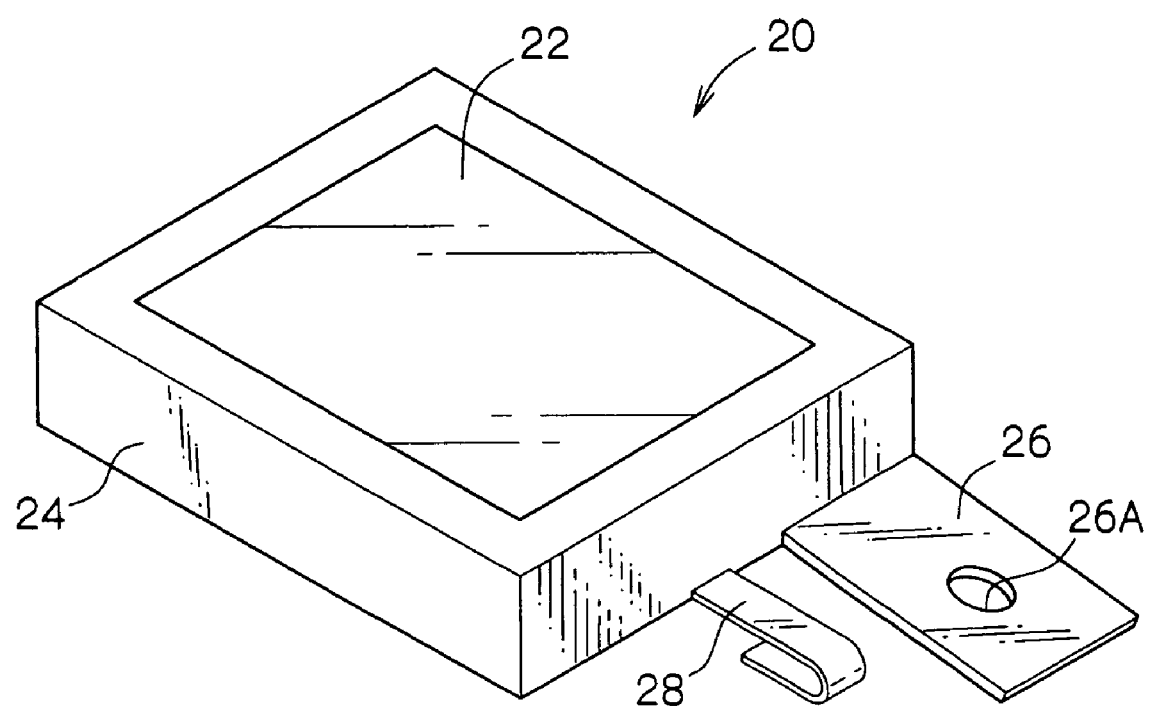
FIG. 5 is a perspective view showing a variant example of an LCD unit.
Figure 6:
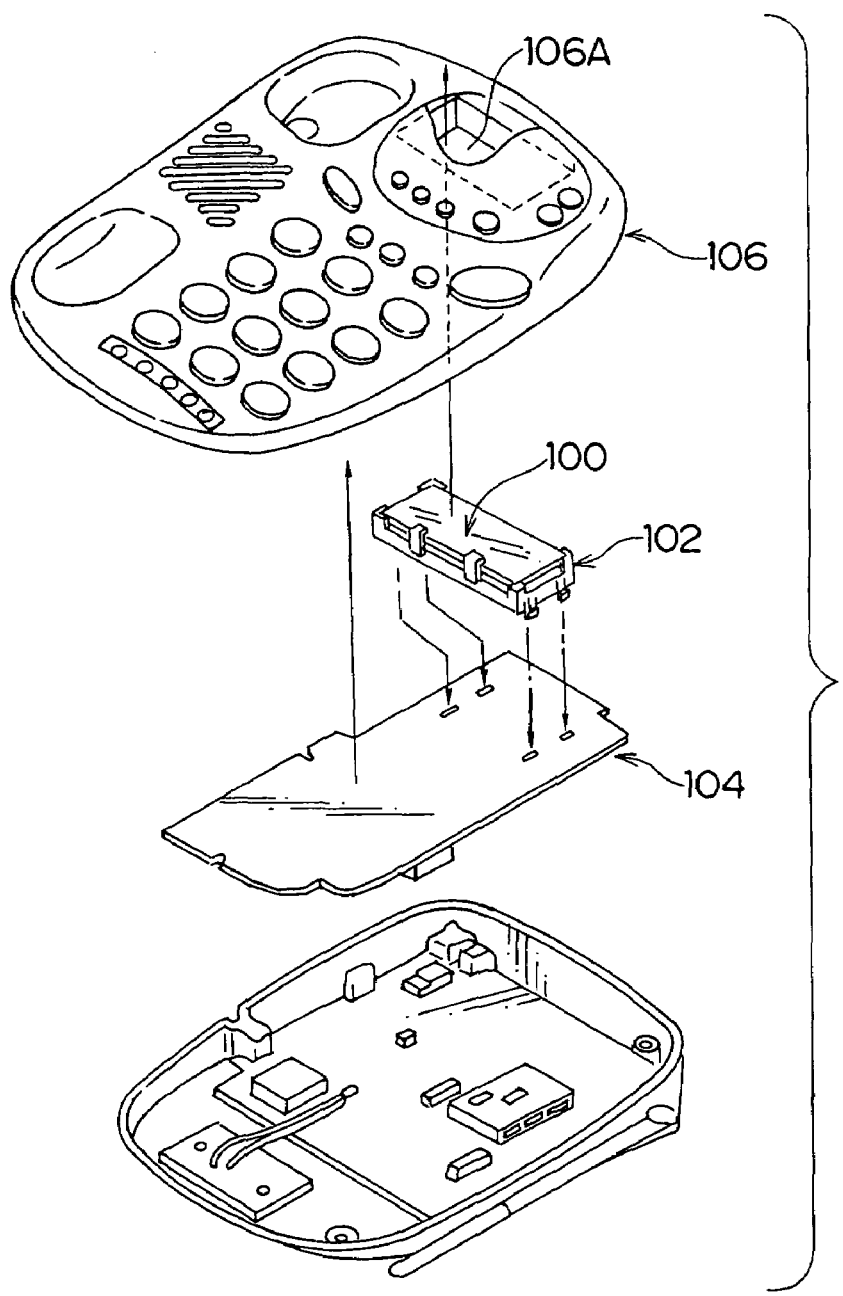
FIG. 6 is an exploded perspective view of an example of a telephone which employs a conventional LCD holder.
Figure 7:
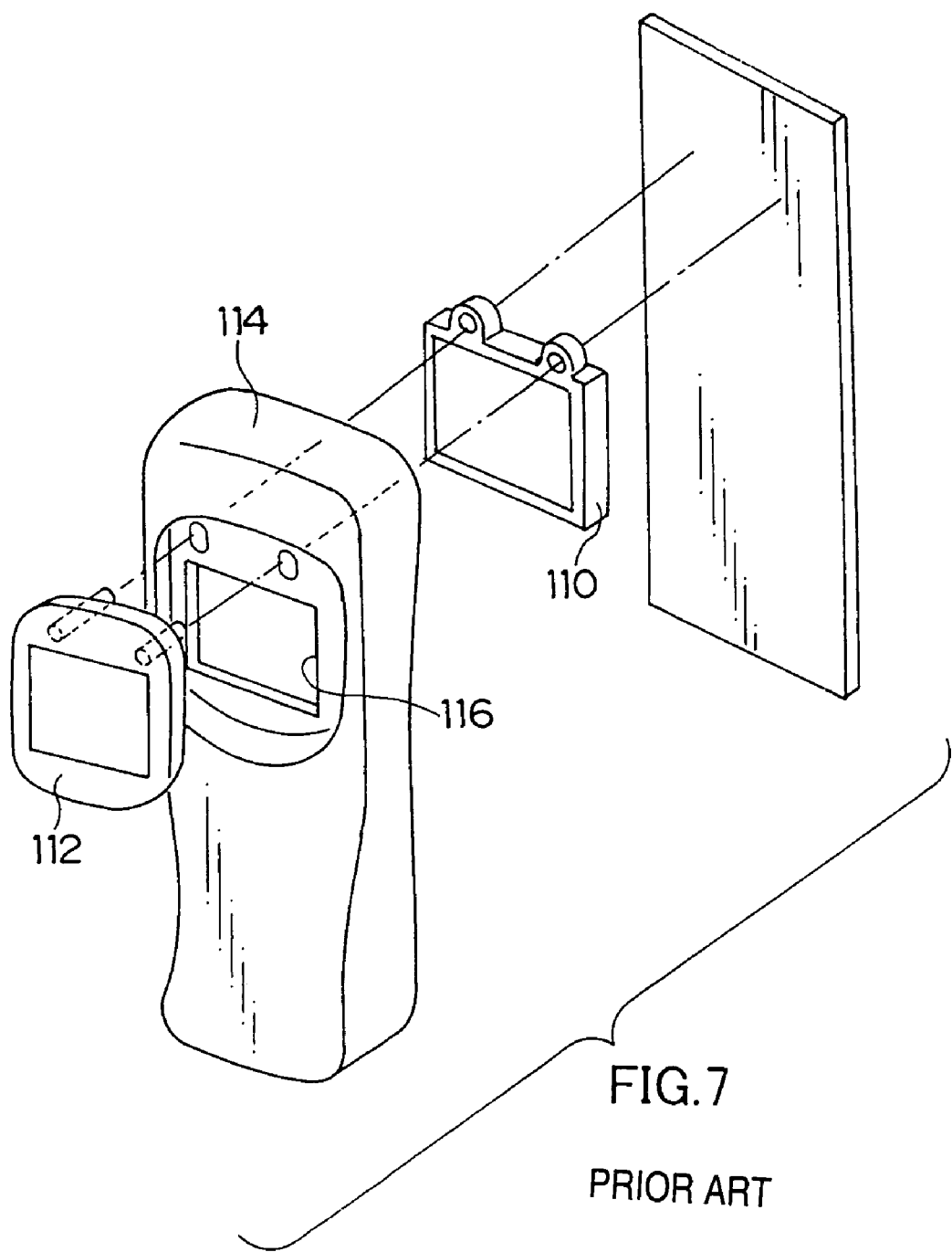
FIG. 7 is an exploded perspective view of an example of a conventional mobile communications terminal device.

As shown in FIG. 5, the reference potential of the LCD unit 20 can also be maintained by mounting a conductive member 28 at the frame portion 24 separately from the mounting portion 26.

The display-positioning mechanism of the present invention is applicable to devices equipped with displays, such as, for example, digital cameras, video cameras, portable telephones, personal computers and so forth. Besides LCDs (liquid crystal displays), the displays can include plasma displays, organic electroluminescent displays (organic EL displays) and so forth.

What is claimed is:

1. A display-positioning mechanism for positioning a display inside a casing which is structured by a first casing body and a second casing body, which is attached to the first casing body, the mechanism comprising:

a base which is fixed in the casing;

a provisional fixing member which attaches the display to the base such that the display is movable within a predetermined range relative to the base;

a positioning portion for restricting movement of the display at a time of attachment of the second casing body to the first casing body, and retaining the display at a predetermined position, and a resilient member for pushing the display against an inner face of the second casing body;

wherein the display comprises a frame portion, and the resilient member is formed integrally with the frame portion, wherein the base is fixed to the first casing body, and
wherein the positioning portion is provided at the second casing body.

2. The display-positioning mechanism of claim 1, wherein the provisional fixing member comprises a stepped screw.

3. The display-positioning mechanism of claim 1, wherein the positioning portion comprises a plurality of projections capable of restricting movement of the display.

4. The display-positioning mechanism of claim 3, wherein the projections are capable of restricting movement of the display in all directions.

5. The display-positioning mechanism of claim 3, wherein the projections are formed integrally with the second casing body.

6. The display-positioning mechanism of claim 1, wherein the base comprises a reference potential terminal for maintaining a reference potential of the display.

7. The display-positioning mechanism of claim 6, further comprising, separately from the resilient member, a reference potential-receiving terminal which is capable of electrically contacting with the reference potential terminal for maintaining the reference potential of the display.

8. A display-positioning mechanism for positioning a display inside a casing which is structured by a first casing body and a second casing body, which is attached to the first casing body, the mechanism comprising:
   a base which is fixed in the casing;
   a provisional fixing member which attaches the display to the base such that the display is movable within a predetermined range relative to the base;
   a positioning portion for restricting movement of the display at a time of attachment of the second casing body to the first casing body, and retaining the display at a predetermined position; and
   a resilient member for pushing the display against an inner face of the second casing body,
   wherein the base comprises a reference potential terminal for maintaining a reference potential of the display, and
   wherein the resilient member comprises functionality as a reference potential-receiving terminal which is capable of electrically contacting with the reference potential terminal for maintaining the reference potential of the display.

9. A display-positioning mechanism for positioning a display inside a casing which is structured by a first casing body and a second casing body in which a display aperture portion is formed, and which is attached to the first casing body, the mechanism comprising:
   a base which is fixed to the first casing body;
   a provisional fixing member which attaches the display to the base such that the display is movable within a predetermined range relative to the base;
   a positioning portion which is provided at the second casing body for restricting movement of the display at a time of attachment of the second casing body to the first casing body, and retaining the display at an accurate position relative to the display aperture portion, and
   a resilient member for pushing the display against an inner face of the second casing body;
   wherein the display comprises a frame portion, and the resilient member is formed integrally with the frame portion.

10. The display-positioning mechanism of claim 9, wherein the positioning portion comprises a plurality of projections capable of restricting movement of the display.

11. The display-positioning mechanism of claim 10, wherein the projections are capable of restricting movement of the display in all directions.

12. The display-positioning mechanism of claim 11, wherein the projections are formed integrally with the second casing body.

13. The display-positioning mechanism of claim 10, wherein the projections are formed integrally with the second casing body.

14. The display-positioning mechanism of claim 9, wherein the projections are formed integrally with the second casing body.

* * * * *